No. 748,382. PATENTED DEC. 29, 1903.
W. KOLLER.
HOSE COUPLING.
APPLICATION FILED DEC. 9, 1902.
NO MODEL.
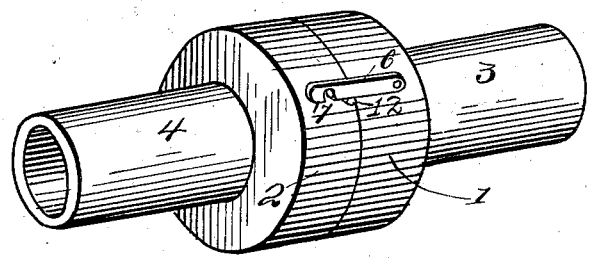
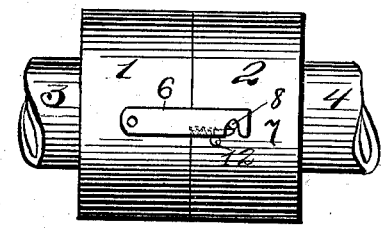 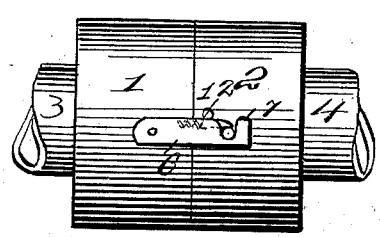
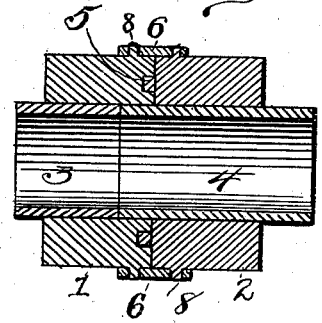 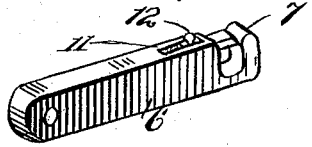
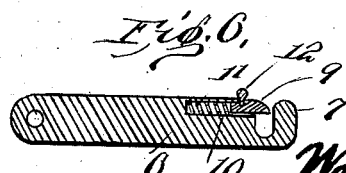
Witnesses:
D. C. Wilson
E. C. Potter
Inventor
Wolfgang Koller
By H. Curtis
Attorneys No. 748,382. Patented December 29, 1903.

UNITED STATES PATENT OFFICE.

WOLFGANG KOLLER, OF PITTSBURG, PENNSYLVANIA.

HOSE-COUPLING.

SPECIFICATION forming part of Letters Patent No. 748,382, dated December 29, 1903.

Application filed December 9, 1902. Serial No. 134,523. (No model.)

*To all whom it may concern:*

Be it known that I, WOLFGANG KOLLER, a citizen of the United States of America, residing at Pittsburg, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplings, and has for its main object to provide novel and effective means for quickly and effectively joining two sections of hose.

Briefly described, the invention comprises two abutting collars, one of which is mounted on one section of the pipe and the other of which is mounted on the abutting end of the other section of the pipe to be coupled. These collars carry a pair of pivoted latches, one on each collar and each of which is provided with a spring-pressed locking-bolt, and these latches engage with studs or pins carried by the collars. One of the collars is preferably provided on its engaging face with a gasket countersunk into the face of the collar to prevent any danger of leakage between the two collars.

All of the above construction will be hereinafter more specifically described and then particularly pointed out in the appended claim, and in describing the invention in detail reference will be had to the accompanying drawings, forming a part of this specification, and wherein like numerals of reference will be employed for indicating like parts throughout the different views, in which—

Figure 1 is a detail perspective view showing my improved coupler in the coupled position. Fig. 2 is a side elevation of the same. Fig. 3 is a like view of the coupler reversed. Fig. 4 is a longitudinal sectional view. Fig. 5 is a detail perspective view of one of the pivoted latches, and Fig. 6 is a longitudinal sectional view thereof.

To put my invention into practice I provide two collars 1 and 2, the former mounted securely on the end of the section 3 of the pipe and the collar 2 mounted securely on the engaging end of the section 4 of the pipe. The collar 1 is provided in its engaging face with an annular groove or recess, and in this groove or recess is seated a flexible gasket 5 of a depth sufficient to project slightly beyond the face of the collar 1 until the collar 2 is engaged firmly therewith to compress the gasket. The collar 1 has pivoted thereto, on one side thereof, a latch 6, provided with a hook end 7, which is adapted to engage with a pin or stud 8, carried on the collar 2. The collar 2 likewise carries a pivoted latch provided with a locking-bolt, the latches of the two collars having their hook ends extending in opposite directions. In order to prevent accidental disengagement of the latches from the pins or studs, I provide each of the latches with a spring-pressed locking-bolt 9, mounted in a recess 10, provided therefor in the face of the latch, and backed by the coil-spring 11. For convenience in operating, each locking-bolt is preferably provided with a small knob 12.

In practice I preferably mount the collar 1 on its pipe projecting beyond the end thereof and mount the collar 2 on its section of the pipe some distance back from the engaging end of this section of the pipe. The joint between the two sections of the pipe will therefore be within the collar 1, as clearly seen in Fig. 4 of the drawings, and should any leakage occur between the ends of the two pipe-sections the gasket prevents same passing out between the two collars.

It is to be noted that, the latches being pivoted to opposite sections, should one become accidentally detached the other will still hold the sections together.

It will be perceived that the latches are mounted to have a vertical rotary movement in a plane transverse to the sections, which has the advantage of obviating to a greater degree the liability of the latches becoming disengaged by encountering obstructions or the like in dragging the hose along the ground than were a different mounting of the latches effected—such, for instance, as mounting the latches so as to have a movement in a plane transverse to the longitudinal axes of the sections.

While I have herein shown and described the invention in detail as it is practiced by me, yet it will be evident that various slight changes may be made without departing from the general spirit of the invention.

Having fully described my invention, what I claim as new, and desire to secure by Letters Patent, is—

In combination with the hose-sections having their ends in abutting engagement, a collar carried by one section and extending beyond the end thereof, said collar having a groove formed therein with a gasket seating in said groove, a collar carried by the other section and located to the rear of the end thereof and adapted to abut the first-named collar at a point to one side of the joint between said sections, and a latch pivoted on each side of one of said collars at diametrically opposing points, and having a vertical rotary movement in a plane transverse to the sections, a stud carried on each side of the other collar and adapted to be engaged by said latches, and a spring-pressed bolt for engagement with said stud carried by the latches.

In testimony whereof I affix my signature in the presence of two witnesses.

WOLFGANG KOLLER.

Witnesses:
H. C. EVERT,
A. M. WILSON.